United States Patent
Yueh

(10) Patent No.: US 9,235,477 B1
(45) Date of Patent: *Jan. 12, 2016

(54) VIRTUALIZED BACKUP SOLUTION

(75) Inventor: Jedidiah Yueh, Irvine, CA (US)

(73) Assignee: EMC CORPORATION, Hopkinton, MA (US)

( * ) Notice: Subject to any disclaimer, the term of this patent is extended or adjusted under 35 U.S.C. 154(b) by 425 days.

This patent is subject to a terminal disclaimer.

(21) Appl. No.: 11/772,183

(22) Filed: Jun. 30, 2007

Related U.S. Application Data

(63) Continuation-in-part of application No. 11/739,311, filed on Apr. 24, 2007.

(60) Provisional application No. 60/794,364, filed on Apr. 24, 2006.

(51) Int. Cl.
| | |
|---|---|
| *G06F 12/00* | (2006.01) |
| *G06F 13/00* | (2006.01) |
| *G06F 13/28* | (2006.01) |
| *G06F 11/14* | (2006.01) |

(52) U.S. Cl.
CPC ........ *G06F 11/1458* (2013.01); *G06F 11/1484* (2013.01)

(58) Field of Classification Search
CPC .......... G06F 17/30067; G06F 11/1456; G06F 11/1458; G06F 11/1469; G06F 11/1451; G06F 11/1464; G06F 3/0623; G06F 3/0662; G06F 3/0683; G06F 9/45541; G06F 9/45533
USPC ....................................................... 711/162
See application file for complete search history.

(56) References Cited

U.S. PATENT DOCUMENTS

| | | | |
|---|---|---|---|
| 5,542,064 | A | 7/1996 | Tanaka et al. |
| 5,642,505 | A | 6/1997 | Fushimi |
| 5,764,972 | A | 6/1998 | Crouse et al. |
| 6,212,512 | B1 | 4/2001 | Barney et al. |
| 6,275,953 | B1 | 8/2001 | Vahalia et al. |
| 6,496,944 | B1 | 12/2002 | Hsiao et al. |

(Continued)

FOREIGN PATENT DOCUMENTS

| | | |
|---|---|---|
| CN | 200780009902 | 6/2010 |
| CN | 200780009902 | 5/2011 |

(Continued)

OTHER PUBLICATIONS

U.S. Appl. No. 11/968,040, filed Dec. 31, 2007, Jedidiah Yueh.

(Continued)

*Primary Examiner* — Sheng-Jen Tsai
(74) *Attorney, Agent, or Firm* — Workman Nydegger

(57) ABSTRACT

A virtualized backup storage application and a method for providing data protection are implemented by running a backup storage application on a virtualization layer of a computer platform. The virtualization layer presents to the backup storage application a normalized representation of a hardware subsystem of the computer platform, shielding the backup storage application from actual hardware devices of the computer platform. A storage device of the computer platform is used to store a raw data set and the backup storage application generates a backup data set of the raw data set. The backup storage application can replicate the backup data set to a virtualized archive of the computer platform and can also restore and recover the raw data set in the event it is lost, corrupted or otherwise destroyed.

20 Claims, 3 Drawing Sheets

(56) References Cited

U.S. PATENT DOCUMENTS

| | | | |
|---|---|---|---|
| 6,732,293 | B1 | 5/2004 | Schneider |
| 6,795,966 | B1* | 9/2004 | Lim et al. ............... 718/1 |
| 6,829,617 | B2 | 12/2004 | Sawdon et al. |
| 6,865,655 | B1 | 3/2005 | Andersen |
| 6,948,039 | B2 | 9/2005 | Biessener et al. |
| 7,093,086 | B1* | 8/2006 | van Rietschote ......... 711/161 |
| 7,096,316 | B1 | 8/2006 | Karr et al. |
| 7,149,858 | B1 | 12/2006 | Kiselev |
| 7,277,905 | B2 | 10/2007 | Randal et al. |
| 7,343,459 | B2 | 3/2008 | Prahlad et al. |
| 7,346,263 | B2 | 3/2008 | Honda |
| 7,346,623 | B2 | 3/2008 | Prahlad et al. |
| 7,437,506 | B1 | 10/2008 | Kumar et al. |
| 7,469,323 | B1* | 12/2008 | Tormasov et al. ......... 711/154 |
| 7,472,242 | B1* | 12/2008 | Deshmukh et al. ........ 711/162 |
| 7,500,001 | B2 | 3/2009 | Tameshige et al. |
| 7,669,020 | B1* | 2/2010 | Shah et al. ............... 711/162 |
| 2002/0069335 | A1 | 6/2002 | Flynn, Jr. |
| 2002/0069369 | A1* | 6/2002 | Tremain ............... 713/201 |
| 2003/0177324 | A1 | 9/2003 | Timpanaro-Perrotta |
| 2003/0217038 | A1 | 11/2003 | Kageyama et al. |
| 2004/0225659 | A1* | 11/2004 | O'Brien et al. ............ 707/9 |
| 2005/0125513 | A1 | 6/2005 | Sin-Ling Lam et al. |
| 2005/0160243 | A1 | 7/2005 | Lubbers et al. |
| 2005/0235288 | A1 | 10/2005 | Yamakabe et al. |
| 2006/0053333 | A1 | 3/2006 | Uhlmann et al. |
| 2006/0059207 | A1* | 3/2006 | Hirsch et al. ............ 707/201 |
| 2006/0174076 | A1* | 8/2006 | Takeda et al. ............ 711/162 |
| 2006/0184937 | A1* | 8/2006 | Abels et al. ............... 718/1 |
| 2007/0174566 | A1* | 7/2007 | Kaneda et al. ............ 711/162 |
| 2007/0179999 | A1 | 8/2007 | Kamei et al. |
| 2007/0180509 | A1 | 8/2007 | Swartz et al. |
| 2007/0286575 | A1 | 12/2007 | Oashi et al. |
| 2008/0013365 | A1* | 1/2008 | Yueh ............... 365/149 |
| 2008/0215474 | A1* | 9/2008 | Graham ............... 705/37 |
| 2008/0215796 | A1* | 9/2008 | Lam et al. ............... 711/100 |
| 2008/0313371 | A1* | 12/2008 | Kedem et al. ............ 710/68 |
| 2009/0222496 | A1* | 9/2009 | Liu et al. ............... 707/204 |
| 2009/0276771 | A1* | 11/2009 | Nickolov et al. ............ 717/177 |
| 2010/0205393 | A1* | 8/2010 | Yueh ............... 711/162 |
| 2010/0275058 | A1* | 10/2010 | Hashimoto et al. ............ 714/8 |

FOREIGN PATENT DOCUMENTS

| | | |
|---|---|---|
| CN | 200780009902 | 9/2011 |
| CN | 200780016805.3 | 4/2012 |
| CN | 201210422261.3 | 3/2015 |
| EP | 0774715 | 5/1997 |
| EP | 0899662 A1 | 3/1999 |
| EP | 07758941.4 | 6/2009 |
| EP | 07758941.4 | 5/2015 |
| JP | 2005-292865 | 10/2005 |
| JP | 2009-501704 | 7/2011 |
| JP | 2009-501704 | 4/2012 |
| WO | WO 99/09480 | 2/1999 |
| WO | WO 99/12098 | 3/1999 |
| WO | WO 02/37689 | 5/2002 |
| WO | WO 2006/017584 | 2/2006 |
| WO | PCT/US07/064440 | 2/2008 |
| WO | PCT/US07/068661 | 8/2008 |

OTHER PUBLICATIONS

U.S. Appl. No. 11/739,311, filed Apr. 24, 2007, Jedidiah Yueh.
U.S. Appl. No. 11/688,203, Sep. 10, 2009, Office Action.
U.S. Appl. No. 11/739,311, Sep. 21, 2009, Office Action.
U.S. Appl. No. 11/688,203, filed Mar. 19, 2007, Jedidiah Yueh.
U.S. Appl. No. 11/746,399, filed May 7, 2007, Jedidiah Yueh et al.
U.S. Appl. No. 11/747,567, filed May 11, 2007, Scott Ogata et al.
U.S. Appl. No. 12/762,769, filed Apr. 19, 2010, Jedidiah Yueh.
U.S. Appl. No. 11/688,203, Mar. 3, 2010, Notice of Allowance.
U.S. Appl. No. 11/688,203, Mar. 24, 2010, Notice of Allowance.
U.S. Appl. No. 11/968,040, Mar. 9, 2010, Final Office Action.
U.S. Appl. No. 11/739,311, Mar. 1, 2010, Final Office Action.
U.S. Appl. No. 11/746,399, May 14, 2009, Office Action.
U.S. Appl. No. 11/746,399, Dec. 14, 2009, Final Office Action.
U.S. Appl. No. 11/747,567, Sep. 30, 2009, Office Action.
U.S. Appl. No. 11/747,567, Feb. 24, 2010, Final Office Action.
U.S. Appl. No. 12/762,769, Jun. 23, 2010, Office Action.
U.S. Appl. No. 11/968,040, Sep. 17, 2009, Office Action.
U.S. Appl. No. 11/968,040, Sep. 3, 2010, Notice of Allowance.
U.S. Appl. No. 11/739,311, Jul. 27, 2010, Office Action.
U.S. Appl. No. 11/746,399, Aug. 5, 2010, Office Action.
U.S. Appl. No. 11/747,567, Sep. 8, 2010, Office Action.
U.S. Appl. No. 12/762,769, Oct. 26, 2010, Final Office Action.
U.S. Appl. No. 11/739,311, Nov. 29, 2010, Final Office Action.
U.S. Appl. No. 11/739,311, Mar. 16, 2011, Office Action.
U.S. Appl. No. 11/746,399, Jan. 19, 2011, Final Office Action.
Sack, "SQL Server 2005 T-SQL Recipes a Problem Solution Approach", pp. 683-716, 2006.
Tooru Miyahara, the latest emulator guide by Vmware&QEMU, SoftwareDesign, book, Gijutsu-Hyohron Co. Ltd., Jul. 18, 2005, pp. 132-141.
U.S. Appl. No. 11/739,311, Sep. 13, 2011, Final Office Action.
U.S. Appl. No. 11/746,399, Jul. 7, 2011, Notice of Allowance.
U.S. Appl. No. 11/747,567, Apr. 29, 2011, Final Office Action.
U.S. Appl. No. 12/762,769, Apr. 15, 2011, Notice of Allowance.
Extended European Search Report dated Aug. 7, 2013 from European Patent Application No. 07762088.
Office Action dated Oct. 24, 2012 from U.S. Appl. No. 11/747,567, filed May 11, 2007.
Office Action dated Apr. 23, 2013 from U.S. Appl. No. 11/747,567, filed May 11, 2007.
Office Action dated Aug. 29, 2013 from U.S. Appl. No. 11/747,567, filed May 11, 2007.
CN Office Action dated Mar. 5, 2014 in CN 200780009902.x.
U.S. Appl. No. 11/739,311, Jan. 6, 2014, Final Office Action.
U.S. Appl. No. 11/747,567, Jan. 13, 2014, Office Action.
U.S. Appl. No. 11/739,311, Sep. 3, 2014, Office Action.
U.S. Appl. No. 11/747,567, May 28, 2014, Final Office Action.
Kaczmarski et al., "Beyond backup toward storage management", IBM Systems Journal, vol. 42, No. 2, pp. 322-337, 2003, IBM.
Rahumed et al., "A Secure Cloud Backup System with Assured Deletion and Version Control", 2011 International Conference on Parallel Processing Workshops, pp. 160-167, 2011, IDDD.

* cited by examiner

VIRTUALIZED BACKUP SOLUTION

CROSS-REFERENCE TO RELATED APPLICATIONS

This application is a continuation-in-part of U.S. patent application Ser. No. 11/739,311 filed Apr. 24, 2007 and entitled CENTRALIZED CONTENT ADDRESSED STORAGE, which in turn claims the benefit of U.S. Provisional Patent Application Ser. No. 60/794,364 filed Apr. 24, 2006 and entitled CENTRALIZED CONTENT ADDRESSED STORAGE. The foregoing patent applications are incorporated herein by reference.

BACKGROUND OF THE INVENTION

1. The Field of the Invention

The present invention relates to data storage and back-up solutions for archiving data and recovering data. More particularly, embodiments of the invention relate to software, hardware, systems, and methods for providing data protection in a manner that provides for high efficiency archiving and portability.

2. The Relevant Technology

Virtualization is an abstraction layer that decouples the physical hardware of a computer from the operating system to deliver greater IT resource utilization and flexibility. Virtualization allows multiple virtual machines, with heterogeneous operating systems, to run in isolation, side-by-side on the same physical machine. Each virtual machine has its own set of virtual hardware (e.g., RAM, CPU, NIC, etc.) upon which an operating system and applications are loaded. The operating system sees a consistent, normalized set of hardware regardless of the actual physical hardware components.

Virtual machines are encapsulated into files, making it possible to rapidly, save, copy and provision a virtual machine. Full systems (fully configured applications, operating systems, BIOS and virtual hardware) can be moved, within seconds, from one physical server to another for zero-downtime maintenance and continuous workload consolidation.

In recent years, virtualization has become increasingly common due to the many advantages it offers. Typically, however, businesses, enterprises, and other entities committing to full virtualization in their computer networks are unable to achieve all the benefits of virtualization when it comes to their data backup and/or archive solution. For example, conventional computer networks are often backed up to a tape archive or virtual tape library ("VTL") via a backup server. Because tape archives are not virtualizable, the backup server is always tied to the tape archive. In other words, even if the backup server is virtualized, the backup server cannot be ported between physical servers due to the connection that must be maintained between the backup server and the tape archive. The problem persists with regard to VTLs as well. Consequently, there currently exists a need in the art for improved backup and archiving solutions in virtualized network environments.

The subject matter claimed herein is not limited to embodiments that solve any disadvantages or that operate only in environments such as those described above. Rather, this background is only provided to illustrate one exemplary technology area where some embodiments described herein may be practiced

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to a virtualized backup storage application that can be implemented in a completely virtualized network environment such that the backup storage application is not tied to a physical device (e.g., tape library or VTL). In one embodiment of the invention, a network environment is virtualized by pooling the resources of the environment and providing a virtualization layer thereon to shield virtual machines operated on the virtualization layer from actual resources. A first application (such as a server) is operated on the virtualization layer to generate a raw data set that is stored to a first shared storage device. A backup storage application is also operated on the virtualization layer to generate a backup data set from the raw data set. The backup data set can be stored to the first shared storage device or to a second shared storage device. Alternately or additionally, the backup data set can be replicated to shared archive storage, such as a SAN.

By running the backup storage application on a virtualization layer and storing backup data to shared storage (e.g., shared storage device or shared archive storage), the backup storage application is not tied to a physical device, in contrast to conventional systems. Additionally, the entire backup storage application can be archived as a virtual system onto the shared archive storage. Consequently, in addition to facilitating the restoration of backup data, embodiments of the invention facilitate the restoration of the archived backup storage application to any hardware subsystem that supports the virtual system.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any data storage arrangement in which archives of digital data, such as data volumes, are generated and maintained.

Figure 1:
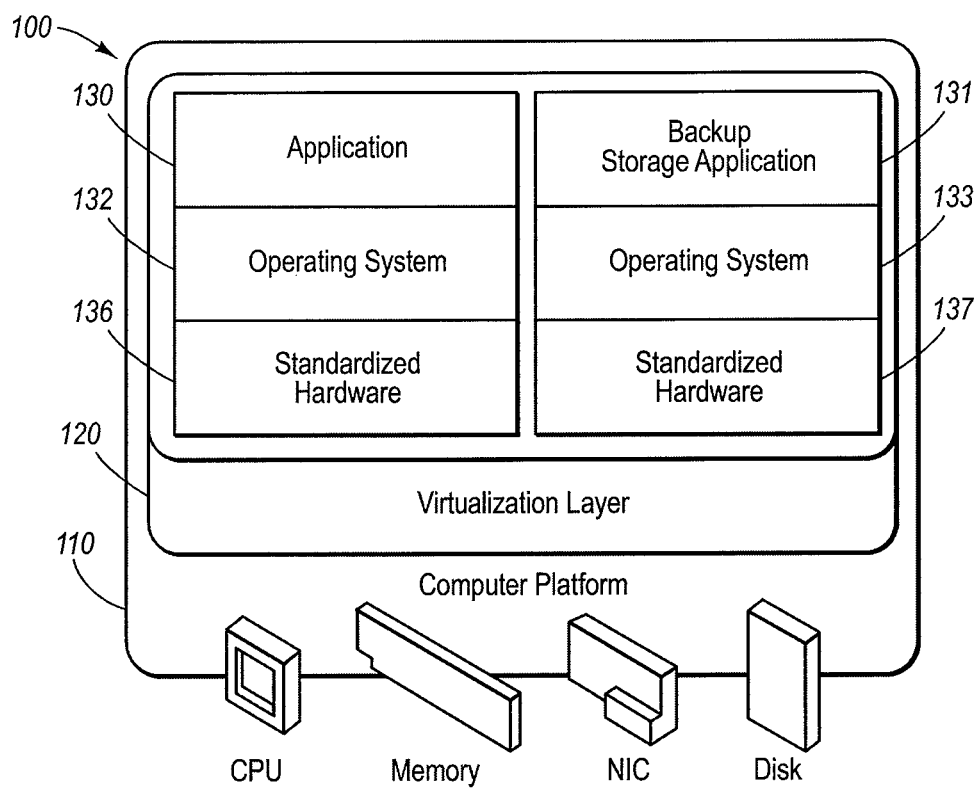
FIG. 1 illustrates a virtualized network environment within which a backup storage application can be implemented according to an embodiment of the invention using a virtualization layer to separate the backup storage application and associated operating system from a computer architecture.

FIG. 1 illustrates one embodiment of a virtualized system 100 in which embodiments of the invention may be implemented. As shown, the virtualized system 100 is built on a computer platform 110 (e.g., the x86 computer architecture or the like) that includes a number of resources such as CPUs, memory, network devices, and disk mechanisms. A virtualization layer 120 is provided to manage access to or "virtualize" the architecture 110 into a uniform pool and separate the hardware of this pool from one or more virtual machines (i.e., the system 100 is shown with 2 such virtual or guest machines running on the virtualization layer 120—but more such machines may be run). The virtualization layer 120 presents a virtualized representation 136, 137 to an operating system 132, 133 of each virtual or guest machine. The operating systems 132, 133 may also vary and may include for example, Windows, Linux, Novell, Solaris, and other operating systems such as FreeBSD and the like.

A server, client, or other application 130 is provided and associated with the operating system 132 and uses the virtual system 136 to store raw data for which it is desired to provide archival backup or data protection. The raw data is stored in virtual memory of the standardized hardware 136.

Similarly, a backup storage application 131 is provided and associated with the operating system 133 and uses the virtual system 137 to process raw data to create a backup data set that is replicated to an archive mechanism in the architecture 110 (such as a disk or optical device). The backup storage application 131 can be virtually any backup storage application including high efficiency data de-duplication storage applications that create space efficient versions (i.e., with a data object typically only being stored once and matched with a unique identifier) of the raw data set. To create space efficient versions of the raw data set, the backup storage application 131 may implement, for example, the sticky byte algorithm disclosed in commonly assigned U.S. Pat. No. 6,810,398 which is incorporated herein by reference, although other algorithms can also be used.

In one embodiment, the storage application is a content addressed storage ("CAS") application. Generally, content-addressed storage (CAS) includes a method of providing access to fixed or specific data content by assigning it a permanent place on disk or other data storage. When a data object is stored in CAS, the object is given a name or identifier (such as a hash number) that uniquely identifies it and that also specifies the storage location, and this type of address is called a "content address."

Generally, the virtualization layer 120 is selected to act as an abstraction layer that decouples the physical hardware from the operating system associated with applications 130, 131 to deliver greater IS resource utilization and flexibility. Virtualization layer 120 allows multiple virtual machines or guest machines (such as may be used to run applications 130, 131), with heterogeneous operating systems, to run in isolation but side-by-side on the same or a different physical machine. Each virtual machine has its own set of virtual hardware (e.g., RAM, CPU, NIC, etc. within the pool 110) upon which an operating system and applications including the applications 130, 131 are loaded. The operating systems see a consistent, normalized set of hardware regardless of the actual physical hardware components.

Advantageously, virtual machines (such as the two virtual machines of FIG. 1) can be encapsulated into files, making it possible to rapidly save, copy and provision a virtual machine. Full systems (fully configured applications, operating systems, BIOS and virtual hardware) can be moved, within seconds, from one physical server to another for zero-downtime maintenance and continuous workload consolidation. Additionally, the virtualization layer 120 provides isolation. Virtual machines are completely isolated from the host machine and other virtual machines. If a virtual machine crashes, all others are unaffected. Data does not leak across virtual machines and applications can only communicate over configured network connections.

Figure 2:
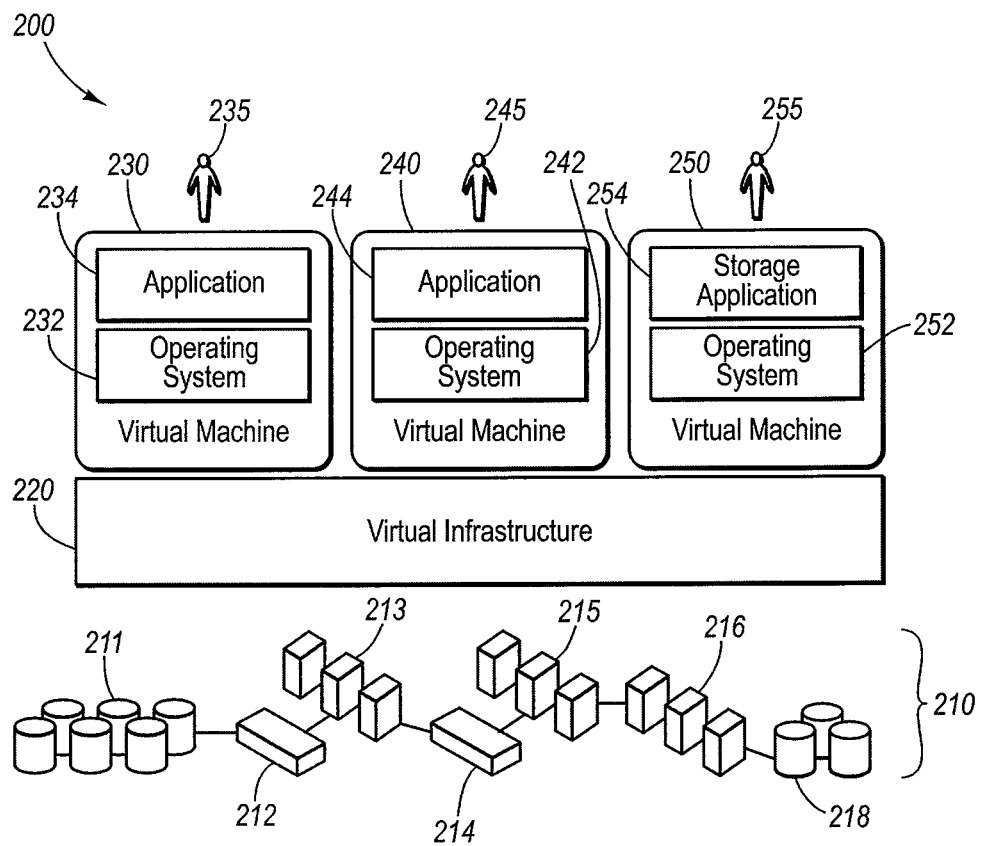
FIG. 2 is another virtualized network environment illustrating the use of a virtual infrastructure or layer to allow multiple virtual machines to access a computer resources pool including devices used for providing archives of data sets.

FIG. 2 illustrates another embodiment of a virtualized system 200 according to the invention. The virtualized system 200 includes a computer resources pool or computer architecture/platform 210 that includes the hardware and associated software available in the system 200. The pool 210 includes storage 211, 218 that may include nearly any type of storage device for digital data such as disk and optical devices. The pool 210 also includes networks/network devices 212, 214 and a number of servers or other computing devices 213, 215, 216 (which may also be used as data storage in some cases with storage 211, 218 being used for archive or backup storage).

Upon the platform 210, a virtualization infrastructure 220 is provided for connecting the resources in pool 210 to users (or to a business/enterprise) 235, 245, 255. The virtual infrastructure 220 provides a dynamic mapping of the resources in pool 210 to one or more virtual machines 230, 240, 250. Each of the virtual machines 230, 240, 250 runs an operating system 232, 242, 252 and an application 234, 244, 254. In the present embodiment of the invention, each of the applications 234 and 244 may be a server, client, or some other application storing raw data to virtual storage physically located on at least one of the server machines 213, 215, 216.

The application 254 is a backup storage application that creates backups of the raw data sets and stores the backups in virtual storage allocated to the virtual machine 250. In some embodiments, the backup storage application 254 can additionally replicate the backup data to an offsite location. For instance, if the virtual machine 250 operates on the server 213, its allocated virtual storage is typically on the server 213. In order to provide data protection, the backup storage application can replicate backup data from the server 213 to remote storage 211, 218. Alternately or additionally, backup data can be replicated at a remote storage array if the remote storage array knows where the virtual storage for the virtual machine 250 is physically located.

The backup storage application 254 may be ported to data that has been archived according to its particular storage methods and may use its recovery functionality to recover or restore such data on a hardware subsystem within pool 210 provided by virtual infrastructure as being capable of supporting the virtual machine 250 and its associated virtual storage system. For example, backup versions of a raw data set archived in storage 211 or 218 may be accessed by a virtual machine 250 via one or more of the servers 213, 215, 216 (and/or other resources in pool 210) to recover a desired set of data, such as based on a recovery request from a user 235, 245, 255.

Advantageously, virtualizing the backup storage solution and having it replicate to virtualized disk storage enables a 100% virtualized environment. In contrast, conventional backup solutions (virtualized or otherwise) remain tied to a physical device (e.g., a tape library or a VTL), even if the computer architecture in which the conventional backup solution is implemented is otherwise completely virtualized. Consequently, conventional backup solutions cannot be moved around within a virtualized environment whereas a backup storage application according to embodiments of the invention can be.

Figure 3:
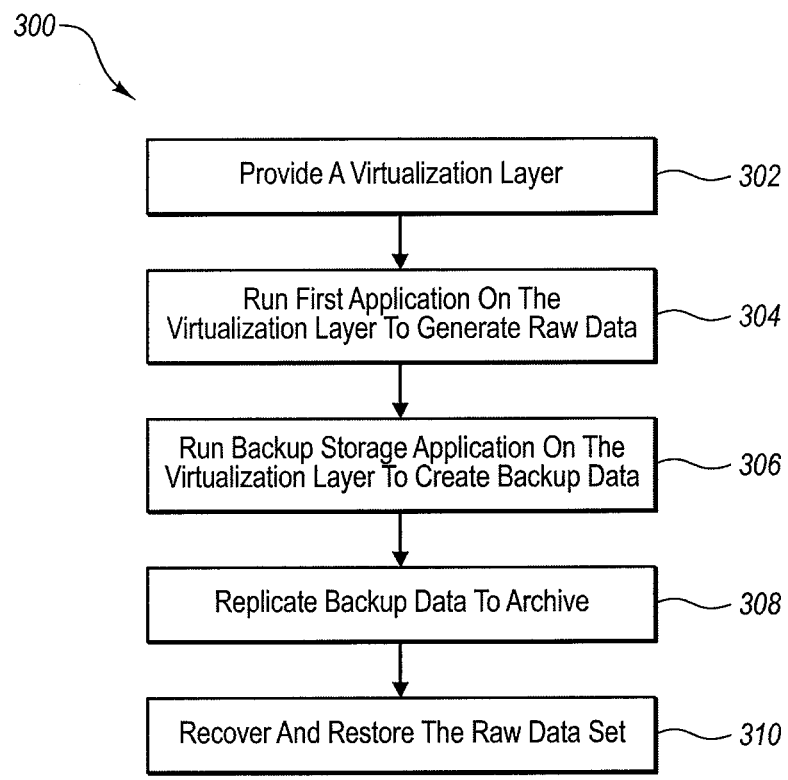
FIG. 3 depicts a method for providing data protection in a computer architecture according to one embodiment of the invention.

With reference now to FIG. 3, a method 300 is illustrated for providing data protection in a computer architecture. A typical computer architecture in which the method 300 may be practiced includes one or more storage devices to which a raw data set is stored, and a hardware subsystem. The computer architecture may additionally include a virtualizable archive mechanism such as disk storage. The process 300 begins by providing 302 a virtualization layer on the computer architecture. A server, client, or other application can then be run or operated 304 on the virtualization layer to generate the raw data, the virtualization layer presenting a representation of at least a portion of the storage device to the application wherein the raw data set can be stored.

A backup storage application can also be operated or run 306 on the virtualization layer to create a backup data set from the raw data set, the virtualization layer presenting a representation of a set of components of the hardware subsystem to the storage application such that the storage application can generate and store the backup data set. In one embodiment of the invention, the hardware subsystem includes the storage device to which the first application stores the raw data set. In this case, the virtualization layer presents a representation of at least a second portion of the storage device to the storage application wherein the backup data can be stored. Alternately or additionally, the hardware subsystem includes a second storage device and the virtualization layer presents a representation of at least a portion of the second storage device to the storage application wherein the backup data can be stored.

In some embodiments of the invention, the backup data set is replicated 308 to the archive mechanism, which may constitute part of the hardware subsystem or may be independent of the hardware subsystem. One skilled in the art will appreciate that in situations where the first application and the backup storage application store the raw data set and the backup data set to different storage devices, it may be unnecessary to replicate the backup data set to an archive. Alternately, where the raw data set and backup data set are stored on the same storage device or on physically proximate storage devices, replicating the backup data to a remote archive may be desired in order to achieve greater data protection. In cases where the backup data set is replicated to an archive, the replication can be performed by the backup storage application and/or by the archive. Optionally, if the raw data set is lost, corrupted, or otherwise destroyed, the storage application can recover and restore 310 the raw data set based on the backup data set. In some embodiments, the backup data set is used to restore and recover the raw data set in response to receiving a recovery request from a user, such as the users 435, 445 and 455 of FIG. 2.

As discussed above, the virtualization layer or infrastructure (such as those shown in FIGS. 1 and 2) may take a number of forms to practice the invention. In one embodiment, however, the backup storage application may be run on VMware virtualization products such as VMware ESX or GSX (or similar products). Virtualization products such as VMware ESX are relatively well known and understood by those skilled in the art and a full discussion is not believed required here to describe the invention. In other embodiments, the virtualization layer is provided by the virtualization product Xen 3.0 (or other versions) from XenSource, and in other embodiments, virtualization products from Microsoft Corporation and/or Intel Corporation are used to provide the virtualization layer described herein.

As discussed above, storage applications of the virtualized systems of FIGS. 1 and 2 may vary to practice the invention. In some embodiments, multiple "virtual" backup storage applications can be operated in a virtualized system and can all operate separately as independent instances. For example, if the application 130 of FIG. 1 was a backup storage application, the backup storage applications 130, 131 could operate independently. However, in other embodiments or implementations of the invention, two or more storage applications may operate together (e.g., in a coordinated manner) as a single system. For example, assuming once again that the application 130 is a backup storage application, the virtual backup storage instances 130 and 131 may cooperate to provide a single backup storage system. Additionally, a single, scalable backup storage system may not only span virtual backup storage instances on a single piece of hardware or architecture but such a backup storage system may also span both "real" backup storage instances on individual hardware as well as other "virtual" backup storage instances on other hardware running virtualization hardware. In effect, the multi-instance backup storage system can be completely heterogeneous in nature.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing data protection, comprising:
providing a virtualization layer on a computer architecture, the computer architecture comprising a hardware subsystem and a storage system;
running a first application on a first virtual machine, the first application generating a raw data set, the virtualization layer decoupling the first application from all physical hardware and presenting a virtual storage device to the first application, the virtual storage device comprising a representation of a first portion of the storage system;
storing the raw data set in the virtual storage device;
running a backup storage application on a second virtual machine to create a backup data set from the raw data set stored in the virtual storage device, wherein the backup data set comprises a de-duplicated data set that includes space efficient versions of data objects in the raw data set such that only one instance of each data object of the raw data set is stored and wherein each data object of the backup data set is matched with a unique identifier that is based upon the content of that particular data object, the virtualization layer decoupling the backup storage application from all physical hardware and presenting a virtual set of components of the hardware subsystem to the backup storage application, the virtual set of components including a virtual storage system comprising a virtual representation of a second portion of the storage system and wherein the backup storage application is operable to run on other virtual machines operating in the computer architecture and is operable to access the backup data from the other virtual machines and restore the backup data to the hardware subsystem and to another hardware subsystem and to other virtual machines;
storing the backup data set to the virtual storage system; and
archiving the backup storage application as a virtual system to an archive storage and archiving the backup data set to the archive storage,
wherein the archived virtual system of the backup storage system can be ported to any data including the backup data set that is backed up or archived according to storage methods of the backup storage application included in the virtual system and wherein recovery functionality of the backup storage application in the virtual system is configured to recover the data to any hardware subsystem that supports the virtual system.

2. The method of claim 1, wherein the computer architecture further comprises a virtualized remote archive, the method further comprising replicating the backup data set to the virtualized remote archive.

3. The method of claim 1, wherein:
the storage system to which the raw data set is stored comprises a first storage device;
the computer architecture further comprises a second storage device physically remote from the first storage device;
the virtualization layer additionally presents a representation of at least a portion of the second storage device to the backup storage application; and
the method further comprises the backup storage application storing the backup data set in the second storage device.

4. The method of claim 1, further comprising using the backup storage application to generate a recovered version of the raw data set on the hardware subsystem based on the backup data set.

5. The method of claim 4, further comprising, prior to using the backup storage application to generate a recovered version of the raw data set on the hardware subsystem, receiving a recovery request from a user.

6. The method of claim 1, further comprising encapsulating one of the virtual machines into a file such that a full system including fully configured applications, operating system, BIOS and virtual hardware can be moved from one physical server to another.

7. A method for protecting data in a completely virtualized network environment, the method comprising:
providing a virtualization layer on a computer architecture, the computer architecture including a storage device;
operating an application on a first virtual machine to generate raw data;
storing the raw data on a virtual storage device included in the first virtual machine;
operating a backup storage application on a second virtual machine to generate backup data based on the raw data stored on the virtual storage device, wherein the backup data comprises de-duplicated data that includes space efficient versions of data objects in the raw data such that only one instance of each data object of the raw data is stored and wherein each data object of the backup data is matched with a unique identifier that is based upon the content of that particular data object, wherein the virtualization layer decouples the backup storage application from a physical storage device included in the computer architecture, and wherein the backup storage application is not tied to a physical device;
presenting a virtual computer architecture to the backup storage application, the virtual computer architecture comprising a representation of the computer architecture and including a virtualized storage device that represents at least a portion the storage device, wherein the backup storage application is operable to run on other virtual machines, and is further operable to recover the backup data from other virtual machines in the computer architecture in addition to the first virtual machine and to virtual machines in another hardware system;
backing up the backup data to the virtualized storage device in the virtual computer architecture; and
storing the backup storage application as a virtual system onto an archived storage and storing the backup data to the archive storage,
wherein the archived virtual system of the backup storage system can be ported to any data including the backup data set that is backed up or archived according to storage methods of the backup storage application and wherein recovery functionality of the backup storage application is configured to recover the data to any hardware subsystem that supports the virtual system.

8. The method of claim 7, wherein matching a unique identifier that is based upon the content of the particular data object comprises generating a hash number for the particular data object, and wherein the method further comprises providing the data object with a content address.

9. The method of claim 7, wherein providing a virtualization layer on a computer architecture further comprises pooling the computer architecture.

10. The method of claim 8, wherein the virtualization layer presents the virtual computer architecture to an operating system of the second virtual machine.

11. The method of claim 7, wherein the computer architecture comprises one or more networks, one or more network devices, or one or more networks and one or more network devices.

12. The method of claim 11, wherein the virtualization layer comprises a virtual infrastructure that connects resources in the computer architecture to users and wherein the virtual infrastructure provides a dynamic mapping of the resources to a plurality of virtual machines.

13. The method of claim 12, wherein each virtual machine runs a respective operating system and a number of instances of the backup storage application, wherein the instances of the backup storage application may be the same or differ.

14. The method of claim 13, wherein each backup storage application is ported to raw data that has been archived according to its storage methods.

15. The method of claim 14, further comprising recovering a particular version of a data set based on a request from a user.

16. A completely virtualized backup storage solution, comprising:
a virtualization layer on a computer architecture, the computer architecture including a hardware subsystem and one or more shared storage devices, and the virtualization layer presenting a virtual computer architecture to each of a plurality of virtual machines, wherein the virtual computer architecture is a representation of the computer architecture; and
a first virtual machine that comprises a backup storage application operable to create a backup data set from a raw data set stored in a virtual storage device of a second virtual machine and to store the backup data set in virtualized memory allocated to the first virtual machine from one of the one or more storage devices, wherein the backup data set comprises de-duplicated data that includes space efficient versions of data objects in the raw data set such that only one instance of each data object of the raw data set is stored and wherein each data object of the backup data is matched with a unique identifier that is based upon the content of that particular data object, and wherein:
the backup storage application is decoupled from the one or more shared storage devices,
virtualized memory can be allocated to other virtual machines from the one or more shared storage devices,
the backup storage application is independent of a physical backup device,
the backup storage application is operable to run on the other virtual machines to access the backup data from the other virtual machines and to recover the backup data to the second virtual machine and to other virtual machines; and
the backup data is backed up as a virtual system and the backup storage application is backed up,
wherein the backed up virtual system of the backup storage system can be ported to any data including the backup data set that is backed up or archived according to storage methods of the backup storage application and wherein recovery functionality of the backup storage application is configured to recover the data to any hardware subsystem that supports the virtual system.

17. The backup storage solution of claim 16, wherein the second virtual machine includes an application operable to generate the raw data set and store the raw data set in virtualized memory allocated to the second virtual machine.

18. The backup storage solution of claim 17, wherein the virtualized memory allocated to the first virtual machine and the virtualized memory allocated to the second virtual machine are in physical proximity, and wherein the backup storage application additionally replicates the backup data set to a virtualized archive.

19. The backup storage solution of claim 16, wherein the computer architecture comprises a x86 computer architecture.

20. The method of claim 1, wherein the first virtual machine and the second virtual machine are the same virtual machine or wherein the first virtual machine and the second virtual machine are different virtual machines, or wherein the virtual system includes both the backup storage application and the backup data set.

* * * * *